J. H. LIDHOLM.
ROTARY TUBE FURNACE FOR PRODUCING CONTINUOUSLY CALCIUM CYANAMID.
APPLICATION FILED FEB. 14, 1914.
1,191,804. Patented July 18, 1916.
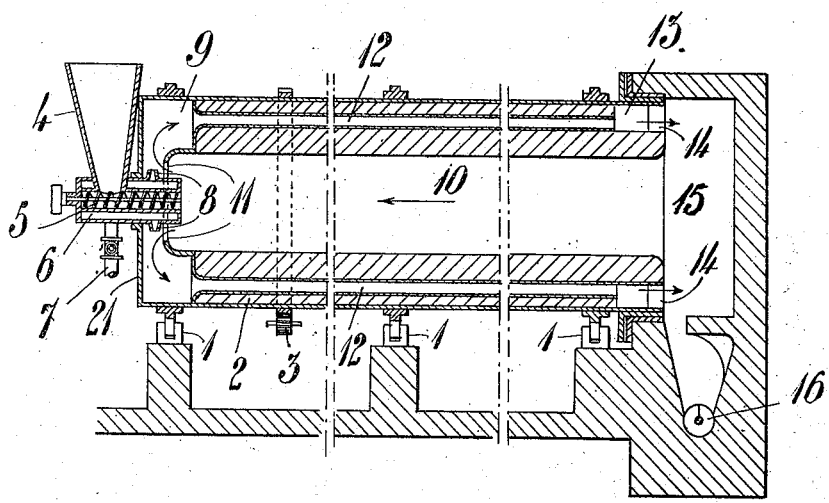

UNITED STATES PATENT OFFICE.

JOHAN HJALMAR LIDHOLM, OF LONDON, ENGLAND.

ROTARY TUBE-FURNACE FOR PRODUCING CONTINUOUSLY CALCIUM CYANAMID.

1,191,804. Specification of Letters Patent. Patented July 18, 1916.

Application filed February 14, 1914. Serial No. 818,788.

*To all whom it may concern:*

Be it known that I, JOHAN HJALMAR LIDHOLM, a citizen of the Kingdom of Sweden, residing at London, England, Great Britain, have invented new and useful Improvements in Rotary Tube-Furnaces for Producing Continuously Calcium Cyanamid, of which the following is a specification.

As is well known, calcium cyanamid is produced by heating calcium carbid in an atmosphere of nitrogen to a temperature of about 1100° C., the nitrogen thereby being absorbed directly, while carbon is separated. Said reaction is usually performed in small retort furnaces heated electrically, and the reaction is completed after about 30 hours.

In order to be able to use larger units of furnaces and to attain a shorter time of reaction, attempts have been made to use rotary tube furnaces for producing calcium cyanamid; as far as known said attempts have not, however, been successful, no doubt, depending upon the difficulties, on the one side, in heating the calcium carbid in such a furnace to the temperature of reaction and, on the other side, in preventing the calcium cyanamid formed from sintering in the zone of reaction proper on account of the heat developed during the reaction after the beginning thereof.

The object of the present invention is to overcome the said drawbacks in using rotary tube furnaces for the manufacture of calcium cyanamid.

The invention consists mainly in this, that the furnace is provided with means for maintaining a continuous circulation of the nitrogen contained in the furnace in opposite direction to the solid material passing through the same. As return passages there are, preferably, used channels provided in the walls of the furnace or a central channel in such manner that the tube furnace forms a closed system of circulation without using outer conduits. As driving agent for said circulation the nitrogen itself supplied under pressure is used. Owing to the insignificant resistance to the circulation of the gases, the nitrogen supplied will be capable of keeping a many times larger quantity of gas in circulation, whereby a uniform distribution of the heat of the zone of reaction is attained, and the heat of the finished material as well as the excess of heat of the zone of reaction may be transported toward the inlet end of the furnace in order to preheat the freshly introduced carbid to the temperature of reaction.

The invention is illustrated on the accompanying drawing showing a vertical longitudinal section of a rotary tube furnace according to my present invention.

Referring to the drawing, the main part of the furnace consists, in well known manner, of a tube 2 resting on ball or roller bearings 1 and provided with a driving device of any kind to rotate the tube about its longitudinal axis. As is usual in rotary furnaces, the tube inclines somewhat toward the outlet end in order to effect automatic feeding of the material through the furnace.

4 is a stationary feeding hopper for the carbid being provided at the bottom with a feeding screw 5 or any other suitable device for feeding the carbid into the furnace. The mantle of the feeding screw is provided with double walls and forms a chamber 6 for distribution of the nitrogen which is supplied under pressure through a conduit 7. The feeding screw and its mantle pass centrally through the end wall 21 of the tube furnace in such manner that the necessary tightening is effected without interfering with the rotation of the furnace. From the distribution chamber 6 a number of injecting nozzles 8 extends into a chamber 9 provided at the inlet end of the furnace and connected at the one side with the main channel 10 of the furnace through apertures 11 and at the other side with longitudinal channel 12 arranged in the mantle of the furnace and leading to the other end thereof. The injecting nozzles may, preferably, be surrounded by conical guiding walls in order to increase the injecting action exerted upon the nitrogen contained in the furnace. At the outlet end of the furnace the channels 12 open into a chamber 13 provided with vanes 14 placed obliquely and between which the nitrogen is ejected with a rotating movement which is maintained during its back passage through the main channel 10 of the furnace, thereby facilitating the exchange of heat between the circulating gas and the solid material passing through the furnace. The outlet end of the furnace extends into a stationary collecting chamber 16 or any other equivalent device capable of collecting the finished material.

At the starting the main channel 10 of the furnace is heated, by burning of gas or electrically in any well known manner, to a temperature of about 1000° to 1300° C. at its middle part, while the temperature may decrease toward the ends. The furnace is then filled up with nitrogen and rotated, and at the same time the feeding of calcium carbid through the screw 5 commences. The introduced carbid moves, owing to the rotation of the furnace and its inclined position, forward through the furnace and is heated to the temperature of reaction. The principal reaction is performed at the hottest middle part of the furnace. As soon as the reaction has commenced, the supply of nitrogen is started and is, preferably, so regulated that a certain overpressure is maintained in the furnace to prevent the air from entering. The nitrogen supplied under high pressure and injecting through the nozzles 8 entrains the nitrogen contained in the furnace causing it to circulate through the chamber 9, the channels 12, the chamber 13, the collecting chamber 15 and the main channel 10 of the furnace. Owing to the insignificant resistance to this circulation of the gas it is possible, by means of the nitrogen supplied, to cause, without difficulty, a many times greater quantity of nitrogen to circulate. This circulation is of very great importance for the performing of the reaction, since it renders an effective utilization of the heat of the finished material possible, regulates the temperature of the zone of reaction and effects the necessary preheating of the freshly introduced material before it enters the zone of reaction. The heat developed during the reaction will, generally, be sufficient to maintain the necessary temperature in the zone of reaction. If, however, the heat developed during the reaction should prove to be insufficient to maintain the temperature of the furnace, the necessary quantity of heat is supplied electrically in any well known manner.

The invention is not limited to the form of the tube furnace shown in the drawing, but may be modified in many respects without deviating from the principal features of the invention. Thus for instance the supply of nitrogen and the nozzles may be located at the outlet end of the furnace, so that the nozzles eject a jet of nitrogen, preferably with rotating movement, directly into the outlet end of the tube furnace. To conduct the circulating nitrogen back to the outlet end of the furnace one may use, at least in shorter furnaces, a pipe extending in the central part of the furnace along the whole length thereof instead of the return channels provided in the wall of the furnace.

Having now described my invention, what I claim as new and desire to secure by Letters Patent is:

1. In a rotary tube furnace for producing calcium cyanamid, the combination of a main channel passing along the tube furnace, longitudinal channels extending through the furnace and communicating at both ends with said main channel, and injecting nozzles supplying the nitrogen to the furnace under pressure for causing the nitrogen contained in the furnace to circulate through the longitudinal channels and the main channel and from the latter back to the longitudinal channels, substantially as and for the purpose set forth.

2. In a rotary tube furnace for producing calcium cyanamid from calcium carbid and nitrogen, the combination of a central main channel passing along the tubular furnace, a chamber arranged at each end of the furnace and communicating with said main channel, longitudinal channels located in the wall of the furnace and extending through the furnace, said longitudinal channels communicating at each end with one of said chambers, and injecting nozzles supplying the nitrogen under pressure into one of said chambers and adapted to force the nitrogen through the longitudinal channels and the main channel and from the latter back to the longitudinal channels, substantially as and for the purpose set forth.

3. In a rotary tube furnace for performing a chemical reaction between a solid mass passing through the furnace and a gas contained in the furnace, the combination of a main channel extending along the tube furnace, longitudinal channels extending through the furnace and communicating at both ends with said main channel, and means for supplying gas under pressure to the furnace to produce a circulation of the gas contained in the furnace through the longitudinal channels and the main channel and from the latter back to the longitudinal channels.

In testimony that I claim the foregoing as my invention, I have signed my name in presence of two subscribing witnesses.

JOHAN HJALMAR LIDHOLM.

Witnesses:
   J. HOLLISON HAILEY,
   MURRAY A. CARSON.